June 14, 1927.  E. J. TRIAY, JR., ET AL  1,632,253
APPARATUS FOR LOADING AND UNLOADING FREIGHT
Filed Oct. 11, 1921   6 Sheets-Sheet 5
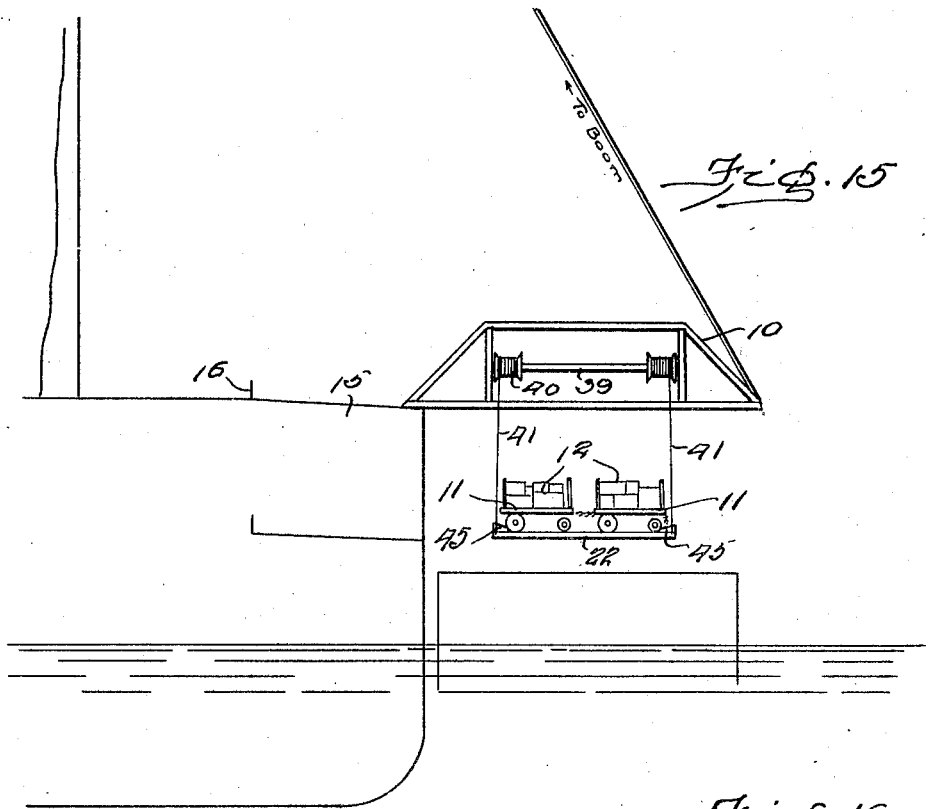
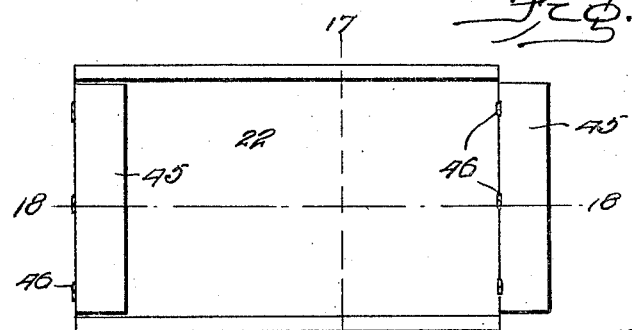
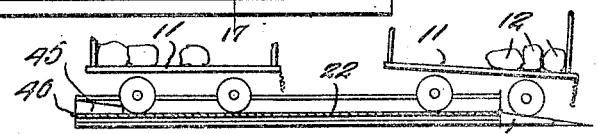
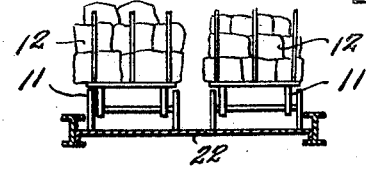
Inventor
Edward J. Triay Jr.
Percy L. Farmer,
By Edwin S. Clarkson Attorney Patented June 14, 1927.

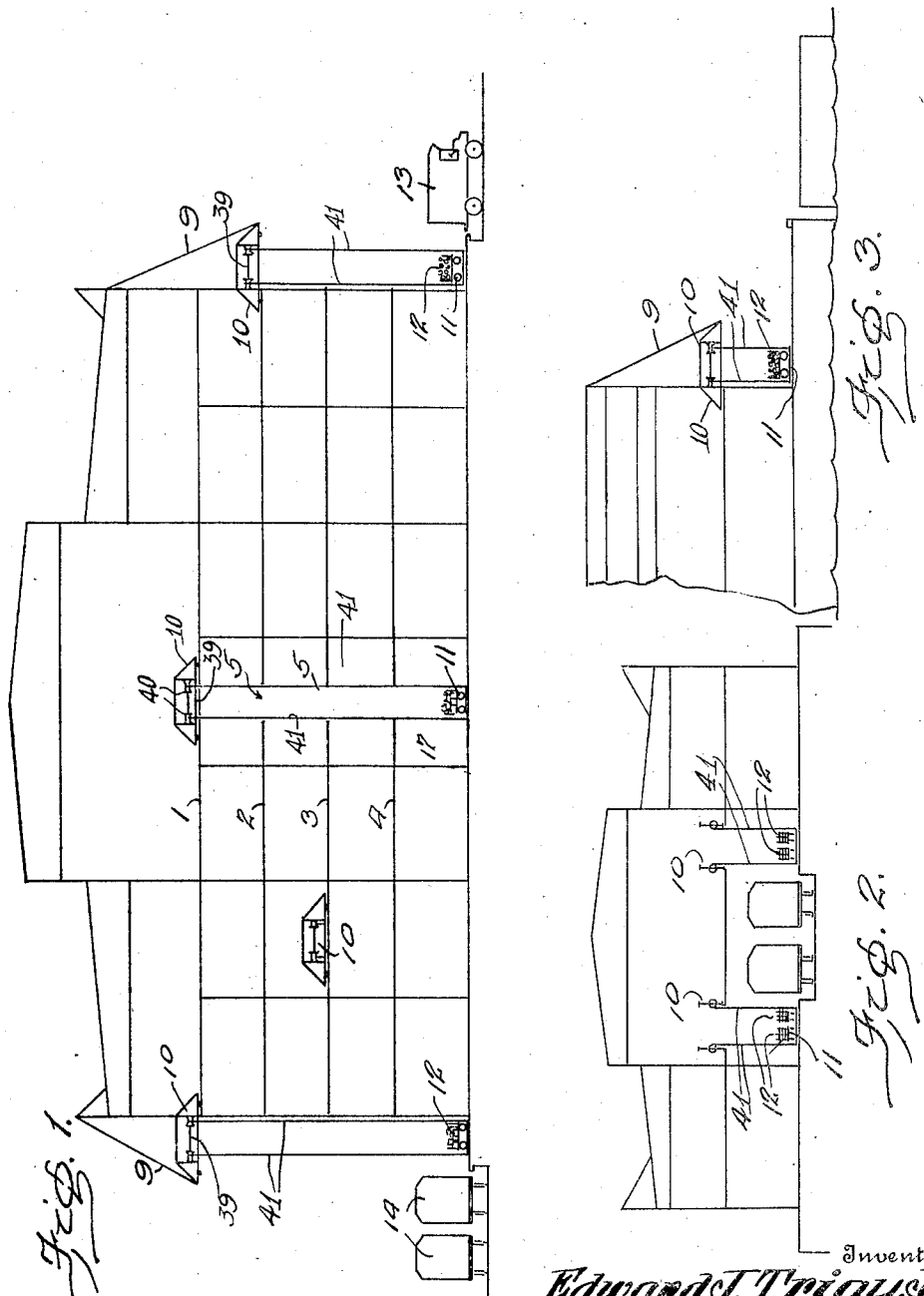

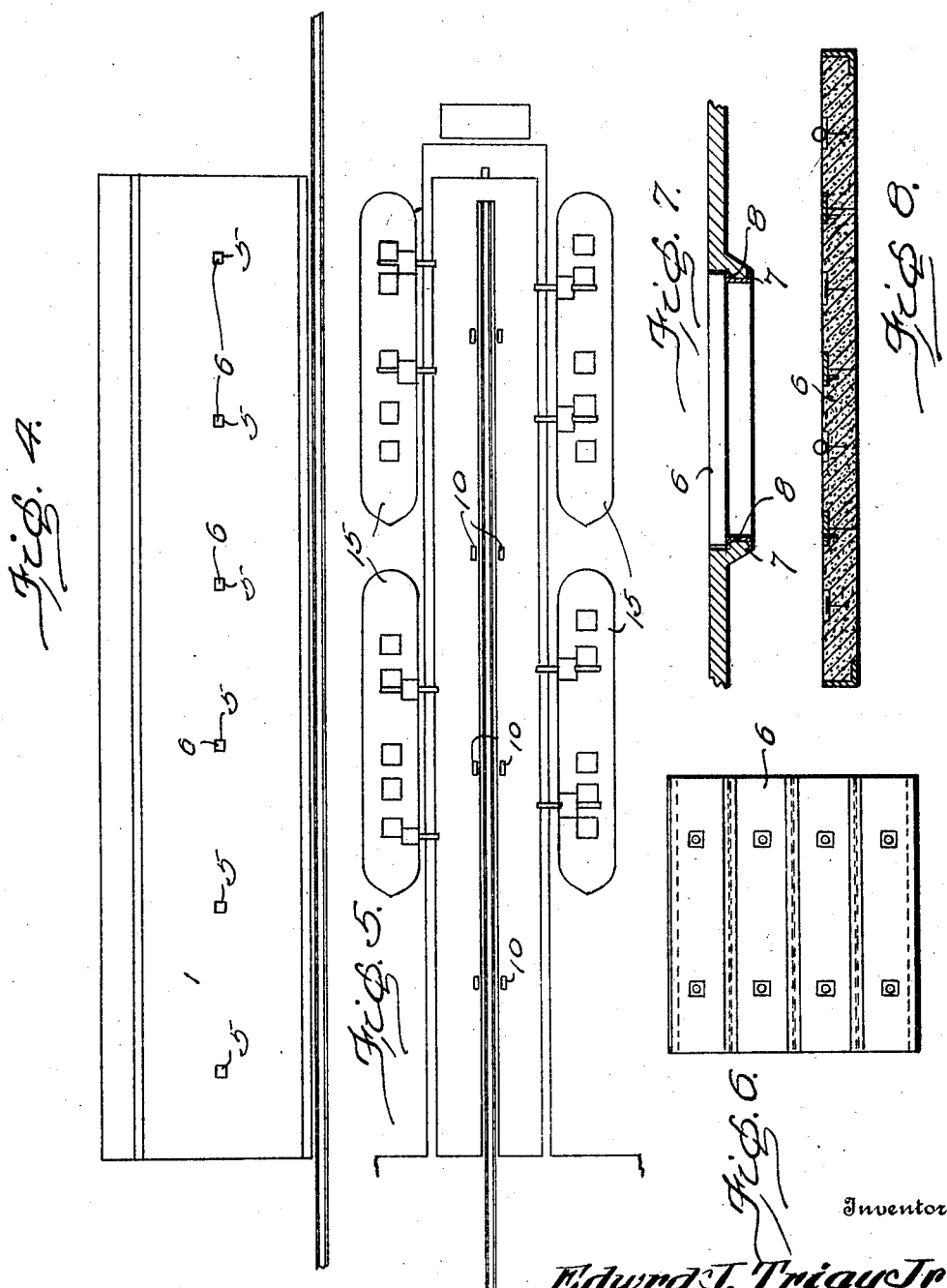

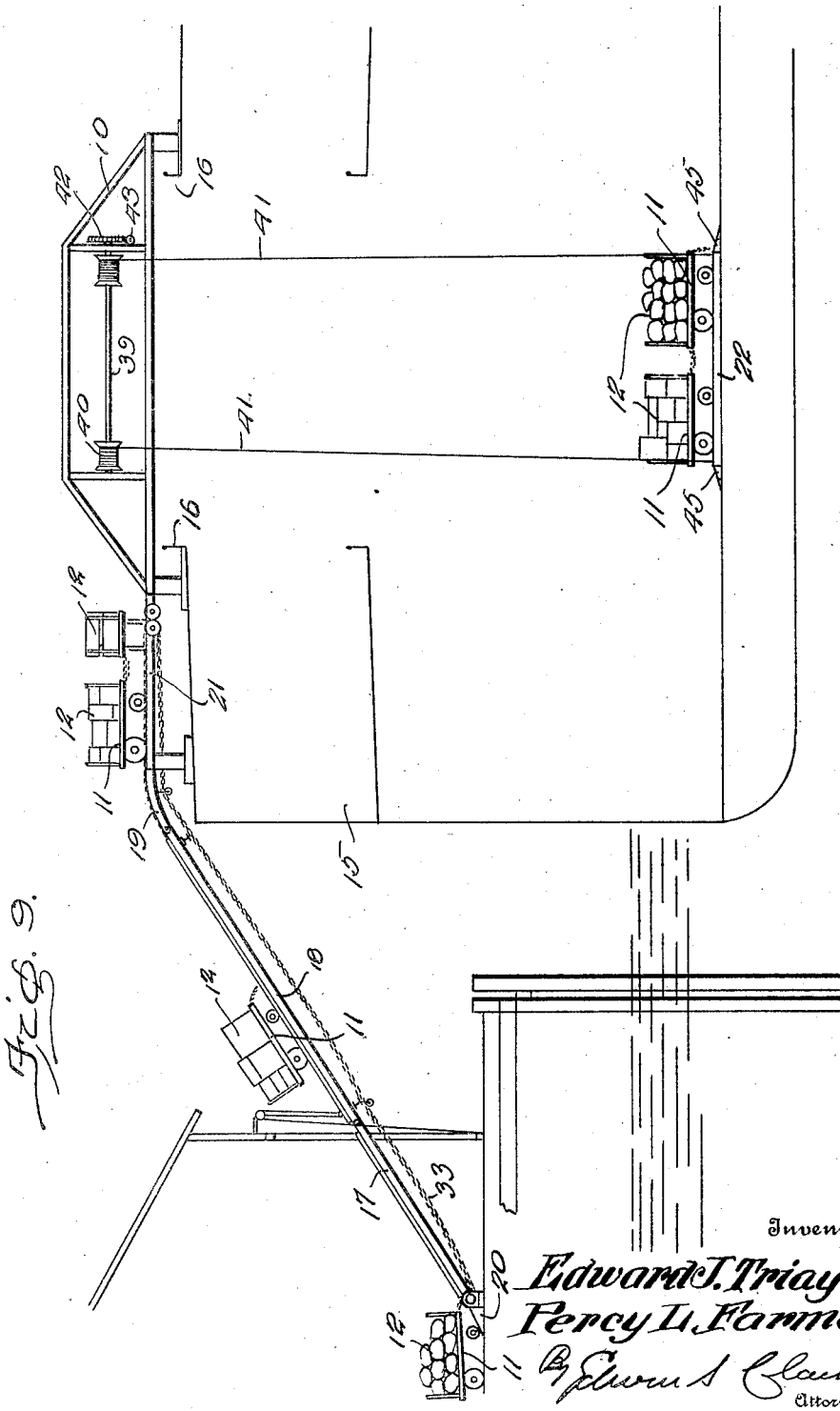

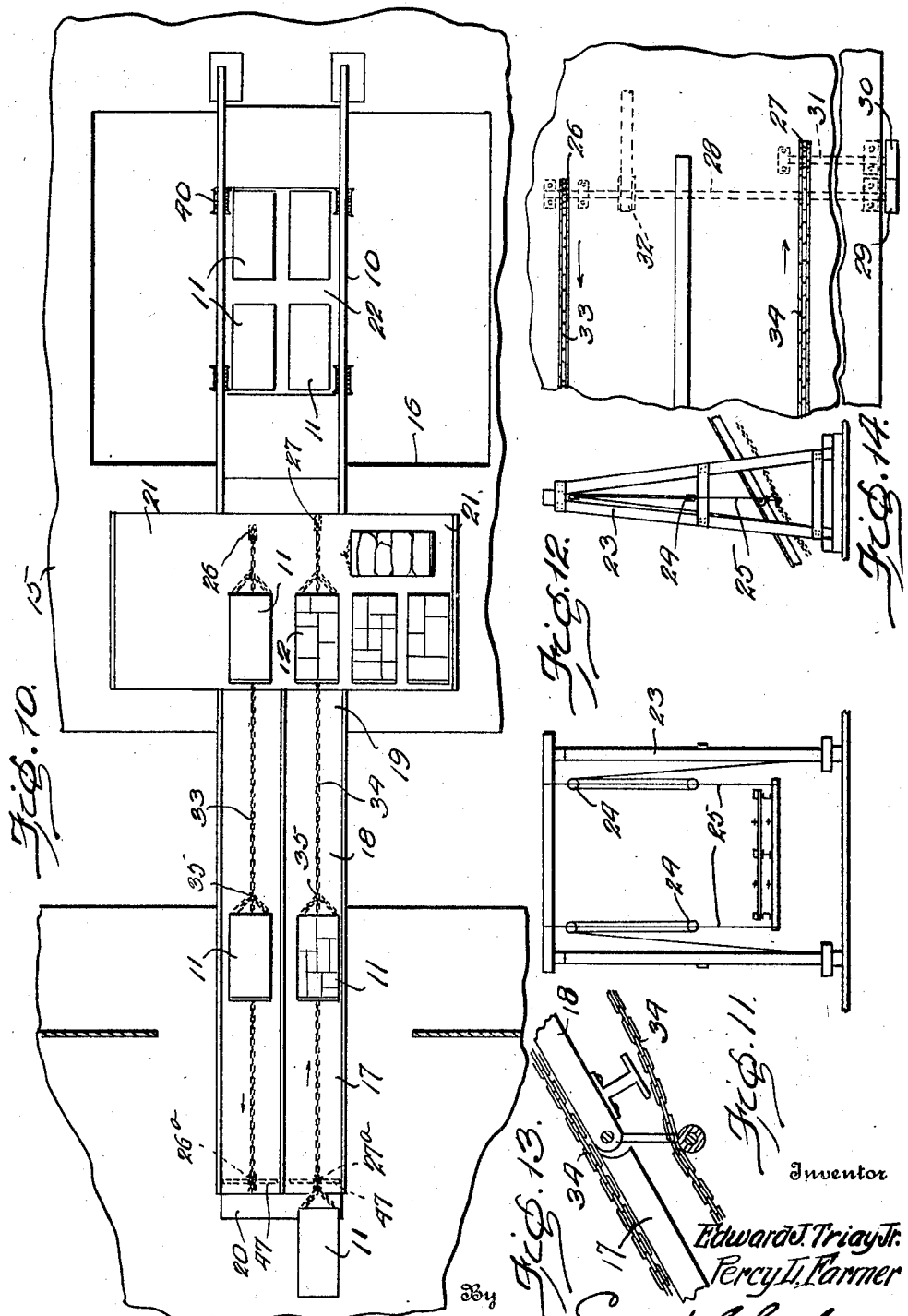

1,632,253

UNITED STATES PATENT OFFICE.

EDWARD J. TRIAY, JR., OF JACKSONVILLE, FLORIDA, AND PERCY L. FARMER, OF RICHMOND, MAINE.

APPARATUS FOR LOADING AND UNLOADING FREIGHT.

Application filed October 11, 1921. Serial No. 506,991.

While we will describe our method and apparatus as being particularly adapted for the handling of freight in connection with railroads and vessels, at the same time, it is to be understood that our method and apparatus can be, with equal efficiency, employed in the handling of articles of various descriptions around and about warehouses and other places.

An objection to the old system of unloading and loading vessels is that under that system it is not practical to build a dock having more than two decks, because it would be impractical and too expensive to unload and load a cargo from a vessel above the second deck of the dock, and when the dock has two decks, it is customary to use ramps to reach second deck. These ramps, by reason of their necessary length, occupy considerable valuable space on the dock, which could be used for the storage or handling of freight, and further the ramps interfere with the operation of the dock.

The object of our invention is to provide a system and apparatus whereby the time required for unloading and loading a vessel is reduced to a minimum.

A further object of our invention is to provide a method and apparatus whereby breakage of the cargo in unloading and loading is reduced to a minimum.

A further object of our invention is to provide a method and apparatus to reduce the number of handlings of the cargo to a minimum.

A further object of our invention is to provide a method and apparatus whereby the ship's cargo may be unloaded and loaded from an unlimited number of decks of a dock.

A further object of our invention is to provide a method and apparatus whereby a cargo may be handled in bulk with carriers from one point to another.

A further object of our invention is to provide a method and apparatus whereby the available square feet surface of a dock is materially increased.

A still further object of our invention is to provide a portable elevator service both inside and outside of a dock and for a vessel's hatches and over the side of a vessel.

A further object of our invention is to provide a deck floor with detachable elevator hatch covers, which covers are, when in position, flush with the surface of the floor of the decks, and of a construction to give them strength equal to that of the floor of the deck.

Another object of our invention is to provide a cargo handling elevator which may be operated within the dock or may be projected for operations beyond the walls of the dock, for raising and lowering cargo directly from or to the deck to which it is to be positioned without interfering with the operations of handling freight on the other decks of the dock.

Our invention consists in the method of loading cargo in bulk on a carrier, elevating said carrier with its load, moving said carrier to the deck of a dock and storing said carrier with its load in bulk at a convenient point on said deck, or conveying said carrier with its load in bulk direct to a truck into which the cargo is loaded for distribution.

Our invention further consists of a method of loading an elevator with cargo in bulk after projecting said elevator through an opening in the wall of the building and beyond the vertical plane of said wall, and lowering said cargo in bulk to the dock level, and removing said cargo in bulk from said elevator and conveying it to a truck, vessel, car, etc.

Our invention consists further in a dock having a plurality of decks, and providing each deck with hatchways, closed by detachable covers at predetermined points throughout the area of each deck, the hatchways of one deck being arranged in vertical alignment with the hatchways of the other decks.

Our invention consists further of a dock, provided with guy-ropes or cables secured to the walls of the dock, and exterior thereof, in combination with a portable elevator adapted to be projected through an opening in the wall of the dock, and the inner end fastened to the building, whereby said elevator may be securely suspended so that cargo may be raised or lowered to and from any deck of the dock exterior to the dock without interfering with the operations on the other decks of the dock.

Our invention consists further in the combination of a hatchway of a vessel of a portable elevator arranged in line with said hatchway, said portable elevator having runways on each end thereof over which freight may be moved from and to the elevator platform.

Our invention consists further in a sectional gangway connecting the runway of the elevator to the dock.

Our invention consists further of a sectional gangway provided with a propelling rope or chain adapted to pull loaded carriers over said gangway to and from the said elevator.

Our invention consists further in a gangway made up of a series of sections extending from the dock to the hatchway of the vessel and provided with a storage area intermediate its end and in substantially near relation to the hatchway of the vessel.

In the drawings:

Figure 1 is a diagrammatic view of a warehouse or similar building in elevation, showing the application of our invention.

Figure 2 is a similar view to Figure 1 except that it is an end elevation.

Figure 3 is a diagrammatic view of a dock equipped with our invention.

Figure 4 is a plan view of one of the decks of a dock showing the hatch ways and covers.

Figure 5 is a plan view of a combined dock and railroad terminal vessels being shown at the dock.

Figure 6 is a top plan view of a hatch cover.

Figure 7 is a vertical section through the hatch cover and deck.

Figure 8 is a vertical sectional view of the hatch cover.

Figure 9 is a diagrammatic view illustrating the loading of a vessel at the dock according to our invention.

Figure 10 is a top plan view of Figure 9.

Figure 11 is an elevation of the supporting frame for the sectional gang plank, said plank being shown in supported position.

Figure 12 is a side elevation of Figure 11.

Figure 13 is an enlarged detail view of the sectional gang plank.

Figure 14 is an enlarged detail top plan view of gang plank.

Figure 15 is a detail diagrammatic elevation of a vessel and a lighter or scow with our loading apparatus in position on the vessel.

Figure 16 is a top plan view of the elevator platform.

Figure 17 is a transverse sectional view of Figure 16 with trucks shown on the platform.

Figure 18 is a vertical sectional view of Figure 17 taken on a line between the trucks of Figure 17.

Figure 19:
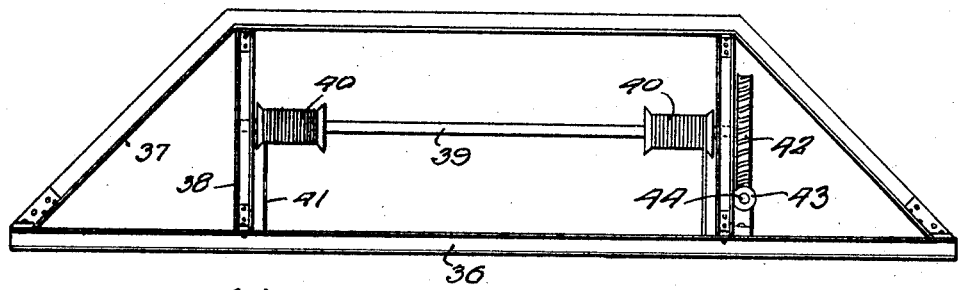
Figure 19 is a side elevation of the elevator.
Figure 20:
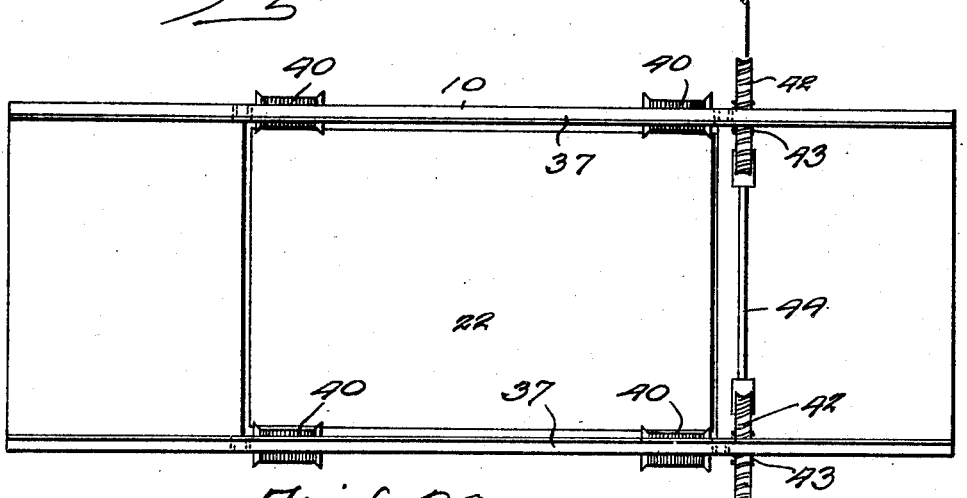
Figure 20 is a top plan view of Figure 19.
Figure 21:
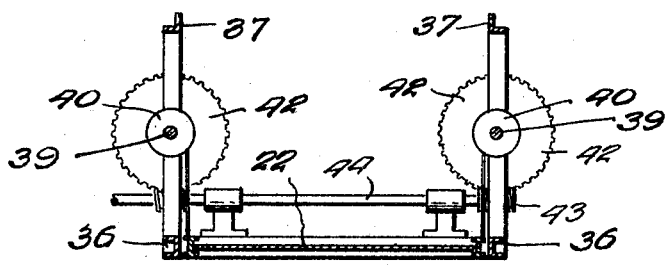
Figure 21 is a transverse sectional view of Figure 20.

The dock, by reason of our method and apparatus, may be built with any reasonable number of decks, one, two, three, four or five, which is a very important consideration in large harbors where shipping space is limited, and by reason of this increased number of decks, the capacity of a given harbor area is materially increased.

These decks are unobstructed by permanent elevator shafts inasmuch as in carrying out our method and invention we provide each deck with hatchways, 5, which are closed when not in use by means of detachable hatch covers, 6; the upper surface of which is flush with the floor of the deck. These hatch covers are designed so that they have the same strength and carrying capacity as the floor of the deck. In case of reenforced concrete floor construction, beams 7, may be provided with shoulders, 8, around the hatchway upon which the hatch covers rest.

The docks are provided with guy-ropes, cables or the like, 9, positioned externally of the walls of the dock, depending and fastened along the face of the walls. These guy-ropes, cables or the like, are arranged so that there is a set of such guy-ropes, cables or the like for each opening on each deck of the dock, whereby a portable elevator, 10, on any of the decks may be projected through an opening in the wall of the dock, and suspended at its outer end by means of the guy-ropes, cables or the like, 9, outside of the walls of the dock, whereby said portable elevator may lower cargo from and elevate cargo to its respective deck without the cargo passing through the building and interfering with the operations on the other decks.

In connection with the portable elevators, we employ wheeled carriers, 11, upon which cargo, 12, may be loaded in bulk and transported in bulk by said carriers from the deck to the elevator, 10, thence lowered to the dock ground floor, and said carriers may then be positioned for unloading their cargo either into trucks, 13, freight cars, 14, or vessels, 15.

If it is desired to arrange the loaded carriers and their cargo within the dock, the covers of the vertically aligned hatchways are removed and a portable elevator, 10, positioned over said hatchways, whereby the carriers may be moved up and down by said elevator to any deck on which it is desired to store the cargo.

On the vessels we position a portable elevator, 10, over and in vertical alignment with the hatchway, 16, of the vessel, and in this connection attention is called to the fact that the construction of the portable elevator does not project a very great distance above the deck of the vessel, so that the rigging and other parts of the vessel above the deck are not interfered with by the elevator structure, besides with this compact construction it enables us to store the elevator and apparatus on the vessel as a part of its equipment, and may be carried by it from port to port.

The sectional gangway is made up of a plurality of sections, 17, 18, 19, which are adapted to be detachably connected at their abutting ends by a flexible joint whereby the gangway adapts itself to the ebb and flow of the tide, without disturbing its operative position, the lower end of the gangway being free from permanent attachment to the dock whereby it may slide upon said dock and at this free end there is disposed a runway, 20, to facilitate the rolling of carriers from the dock onto the gangway.

The section 19 of the gangway is provided with a storage-platform, 21, in close proximity to the elevator and hatchway, whereby the carriers, 11, may be stored and shifted out of the path of the travel of carriers on the gangway. This is important because in many instances, the carriers are delivered over the gangway to the deck of the vessel faster than they can be lowered by the elevator to the hold of the vessel, and by having this storage space, we can obviate the necessity of slowing up of the delivery of the loaded carriers.

When the loaded carriers are placed upon the platform, 22, of the elevator the platform is lowered into the hold of the vessel to the deck on which it is desired to store the cargo, and as the cargo is maintained in bulk on the carriers, it may be carried in bulk to any point on the deck within the hold of the vessel at which point the cargo may be removed from the carriers, and positioned upon the deck of the vessel, in the hold thereof; whereby, we eliminate the breakage and damage to the cargo in unloading and loading. In unloading a ship this method is reversed.

After the sectional gang plank is assembled, there is, in some instances, an absence of the necessary support intermediate its ends, especially in the case of an open dock, therefore, we provide for such support the A frame 23, having suitable block and tackle, 24, which is connected with rods, 25, which in turn are suitably secured to an intermediate section, such for instance as section 18 of the gangway.

On section 19 of the sectional gang plank is provided two sprocket wheels, 26 and 27, the sprocket wheel 26 being mounted upon the shaft 28, to which shaft is suitably secured a gear wheel 29, which meshes with the gear wheel 30 suitably secured on the shaft 31, on which also is suitably secured the sprocket 27. The shaft 31 is suitably connected with any suitable power. Lower end of section 17 of the sectional gangway is provided with sprocket wheels 26$^a$ and 27$^a$ mounted on separate shafts, 47. Endless cables, chains, or the like 33 and 34, are mounted on said gangway and are propelled by means of the sprocket wheels 26—26$^a$ and 27—27$^a$ when the shaft, 31, is set in motion.

The carriers, 11, are provided with hooks or other couplings, 35, which are adapted to clutch with the cable or chain, 34, whereby said carriers are brought upward to the deck of the vessel over the gangway, as will be clearly understood. The carriers are coupled to the cable or chain, 33, in their downward descent over the gangway whereby they are prevented from making an unduly rapid descent.

Referring now to the elevator, it will be be seen that it comprises a rectangular base frame composed of commercial channel bars, 36, upon which is mounted a truss frame 37 said base frame having runways 36$^a$. The standards 38 of the frame are provided with journal bearings in which the shaft 39 is journaled; there being one of these shafts on each side of the elevator frame, said shafts being provided with winding drums, 40, which are provided with the usual cable grooves. Suitable cables, 41, are wound upon these drums and support the platform, 22, of the elevator. At one end of each of the shafts, 39, are secured a gear wheel, 42, which meshes with a worm gear, 43, on the shaft 44, which shaft extends transversely of the elevator frame and may be connected to any suitable source of power, whereby the cables, 41, may be wound and unwound from the drums 41, and the platform, 22, raised or lowered as may be required.

In many instances in large harbors it is customary to collect the cargo on lighters, and under the old system many of these lighters would remain loaded and lay idle for days at a time awaiting the arrival of the ship, resulting in a loss in the use of the lighters which amounts to considerable in the course of a year. By our system the cargo of these lighters can be loaded on the carriers, 11, which carriers are stored in the dock until the arrival of the vessel and are then, with the cargo in bulk on each, intact, conveyed as above described to the vessel and lowered into the hold of the vessel, and when properly positioned in the hold of the vessel, the cargo is removed from the carriers and stored in the vessel. By this means, the lighters are free for constant use.

We have shown a modified construction of a runway for the portable elevator wherein the runway, 45, is connected by a hinged or other flexible joint, 46, to the end of the base frame, 36, of the elevator structure, so that after the trucks or carriers, 11, have been placed on the platform of the elevator, the runway, 45, when thrown back on to the platform of the elevator, functions as a chock to prevent the carriers from rolling off the end of the elevator platform.

By providing a transfer platform building of two, three, four or five stories high, or in other words one, two, three, four or five decks for carrying freight, the length of the usual transfer platform could be reduced to one-quarter its length and obtain the same square foot area of freight capacity and at the same time obviate the long hauls of freight to make up solid cars for objective points, for the reason that the movable elevators 10 could be used with cables 9 on a building constructed to permit of their being shifted on each floor outside of the wall of the transfer platform and lowering freight perpendicular to the wall of the transfer platform, the transfer platform being enclosed and not open to the weather elements as they are now built, down onto a runway in front of the cars that would be placed alongside of the transfer platform and the cars could be drilled out as fast as loaded on one side and the empties on the other side and new shifts made of loads and empties as often as might be required. The number of cars that could be unloaded and loaded from a transfer platform designed to permit of this operation as described herein could unload and load a greater number of cars per square foot of space when constructed along the lines described than a platform of one deck as is now used by railroads. It may be seen that the obviating of weather damages by this method and the reducing of the length of floor space to be watched and guarded that it will reduce in a large measure the damages occurring to freight from trucking same long distances, weather damages and loss from theft, together with the time saved in labor, it will mean tremendous savings to railroads.

Where railroad terminal facilities are at present inadequate due to their inability to operate economically by unloading freight and placing it in a freighthouse for storage awaiting export or other disposal, the cars are held for a period longer than would be required under the method which we have invented to make available on an economical operating basis a series of decks of freighthouses or such other places as freight might be stored in to await disposal and thereby release railroad car equipment which is valuable to railroads only when it is available for purposes of moving traffic so as to earn the greatest possible revenue for railroads by getting the greatest number of days in service as a loaded car, which means gross earnings on the basis of days loaded and in transit throughout the year.

It is obvious that the movable elevator might be provided with wheels geared to suitable power on said elevator so that it might be a self-propelled machine.

What we claim is:

1. A portable elevator comprising a base frame having an opening therethrough and a movable platform arranged within said frame, and adapted to pass through said openings, runways at each end of said base frame on line with said opening for loading and unloading the said platform.

2. A portable elevator comprising a base frame having an opening therethrough and having runways on each end thereof, a movable platform arranged within said base frame and in alignment with said runways, and adapted to pass through said opening, supports secured to said base frames, winding drums and shafts operatively connected to said supports and means to operate said shafts, and winding drums, and cables wound on said drums and connected with said platform.

3. A combination of a portable elevator comprising a base frame having an opening therethrough, a platform arranged within said frame, and adapted to pass therethrough, means mounted on the frame to elevate and lower the said platform, and a runway at each end of the frame in alignment with said platform, one of said runways having oppositely revolvable sprocket wheels, of a gangway, a pair of oppositely moving cables geared to said gangway, said cables engaging the said sprocket wheels on the runway of the gangway.

4. In a portable elevator, a combination of a base frame and a movable platform of a runway hinged to the ends of said frame and adapted to be folded within the perimeter of the base frame on to the platform, and function in such position as a choke for wheeled vehicles on said platform.

In testimony whereof we affix our signatures.

EDWARD J. TRIAY, Jr.
PERCY L. FARMER.